United States Patent
Keller (10) Patent No.: US 8,867,878 B2
(45) Date of Patent: Oct. 21, 2014

(54) FIBER OPTIC CABLE DESIGN WITH CLEAR BUFFER TUBES

(75) Inventor: David Keller, Cary, NC (US)

(73) Assignee: Nexans, Paris (FR)

(*) Notice: Subject to any disclaimer, the term of this patent is extended or adjusted under 35 U.S.C. 154(b) by 508 days.

(21) Appl. No.: 12/816,467

(22) Filed: Jun. 16, 2010

(65) Prior Publication Data

US 2011/0038586 A1    Feb. 17, 2011

Related U.S. Application Data (60) Provisional application No. 61/220,784, filed on Jun. 26, 2009.

(51) Int. Cl.
*G02B 6/44* (2006.01)
*B29D 11/00* (2006.01)
*G02B 6/04* (2006.01)

(52) U.S. Cl.
CPC .............. *G02B 6/443* (2013.01); *G02B 6/4484* (2013.01); *G02B 6/441* (2013.01)
USPC .......... 385/112; 264/1.28; 264/1.29; 398/142

(58) Field of Classification Search
CPC .... G02B 6/4433; G02B 6/4432; G02B 6/443; G02B 6/4403; G02B 6/4401; G02B 6/44; G02B 6/4484; G02B 6/4486; B29D 11/00663
USPC .......... 385/109–113; 264/1.28, 1.29; 398/142
See application file for complete search history.

(56) References Cited

U.S. PATENT DOCUMENTS

| | | | | |
|---|---|---|---|---|
| 4,230,395 A | * | 10/1980 | Dean et al. ................. | 385/109 |
| 5,684,904 A | * | 11/1997 | Bringuier et al. ............ | 385/109 |
| 2005/0031277 A1 | * | 2/2005 | Japon .......................... | 385/109 |
| 2006/0198585 A1 | * | 9/2006 | Keller et al. ................. | 385/107 |

FOREIGN PATENT DOCUMENTS

JP        02226107 A    *    9/1990

OTHER PUBLICATIONS http://scifun.chem.wisc.edu/chemweek/polymers/polymers.html, Jun. 6, 1997.*

* cited by examiner

*Primary Examiner* — Ryan Lepisto
*Assistant Examiner* — Erin Chiem
(74) *Attorney, Agent, or Firm* — Sofer & Haroun, LLP (57) ABSTRACT

A fiber optic cable has at least one fiber and at least one buffer tube surrounding the fiber, with the fiber being loosely held within the buffer tube. A jacket surrounds the tube where the at least one buffer tube is constructed from an extruded transparent polymer, allowing the arrangement of the fiber within the buffer tube to be visible along the entire length of the tube.

10 Claims, 8 Drawing Sheets

FIBER OPTIC CABLE DESIGN WITH CLEAR BUFFER TUBES

RELATED APPLICATION

This application claims the benefit of priority from provisional patent application No. 61/220,784 filed on Jun. 26, 2009, the entirety of which is incorporated by reference.

BACKGROUND

1. Field of the Invention

This application relates to communication cables. More particularly, this application relates to fiber optic cable design.

2. Description of Related Art

Fiber optic cables, such as loose tube fiber optic cables, are generally constructed with an outer jacket, one or more buffer tubes therein and one or more fibers contained within each buffer tube. The fibers within each buffer tube may also be further contained within a furcation tube. A furcation tube is a small tube that typically contains one UV coated type fiber to protect that fiber for a short distance beyond the coverage of the jacket/buffer tube after stripping.

Generally, when manufacturing loose tube type fiber optic cables, one major concern is fiber length differential, which relates to the difference in length between a buffer tube and the fiber(s) contained therein.

Figure 1:
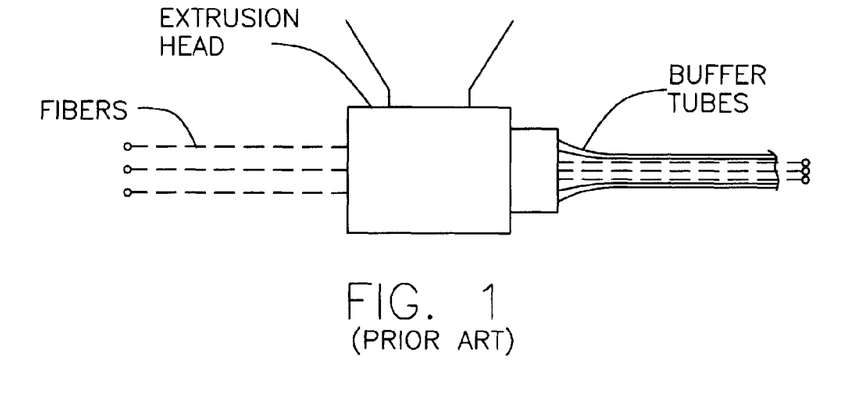
FIG. 1 shows a prior art fiber in tube arrangement, with appropriate fiber excess length.

For example, in prior art FIG. 1, an exemplary extrusion line is shown with fibers passing through an extrusion head, with a buffer tube being extruded thereon. In this Figure, the excess length is properly controlled so that the fibers in the buffer tube are substantially straight.

Figure 2:
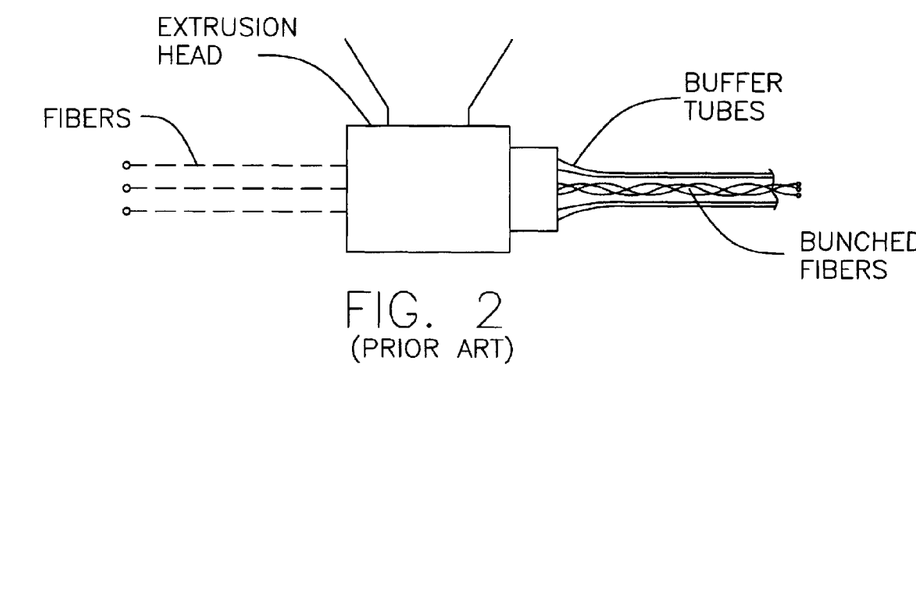
FIG. 2 shows a prior art fiber in tube arrangement, with too much excess fiber length.

However, as shown in prior art FIG. 2, if the production line is improperly arranged, and the fibers exhibit an excess length relative to the buffer tube, then the fibers will ultimately bunch up within the tube. This results in the fibers having excessive curves within the tube, possibly further exacerbated when the final cable is installed around various curves, resulting in signal attenuation in the fibers.

For example, if the fiber length is too excessive relative to its buffer tube, the fibers may be already bent, or likely to bend on installation, beyond a 15 degree angle resulting in attenuation of signals passing there through due to light escape at the acute bending points. As a separate issue (not shown), if the fibers are too short the tubes and jackets need to be shortened down before the connectors can be added, which is time consuming.

In order to address this, production line products of tubed optical fibers are periodically tested after production to measure excess length to ensure it is within the desired parameters. If it is not, the excess fiber length must be adjusted by altering any one or more than one of the production parameters, such as fiber payoff tension, follow-on tension (set at various drag points), fiber positioning (towards and away from the center of the tube during extrusion), etc. . . . ).

This process of trial and error to get the production line parameters correct, and then maintenance of the production line parameters during continuous use is time consuming.

OBJECT AND SUMMARY

It is desirable to increase the ability of loose tube fiber optic cable manufacturers to be able to control fiber excess length parameters on the fly (during production) as well as to be able to visually exam fiber excess length without the need for repeated testing. Moreover, it is desirable to allow loose tube fiber optical cable installers to inspect an installation to determine if their installation has resulted in an undesirable excess fiber length.

The present arrangement overcomes the drawbacks associated with the prior art and provide for clear buffer tubes within the jacket so that the fibers and/or fibers in furcation tubes, can be seen both during manufacturing as well as after production so that any issues regarding the fiber length differential may be visually identified and addressed.

To this end, the present arrangement includes a fiber optic cable having at least one fiber, at least one buffer tube surrounding the fiber, with the fiber being loosely held within the buffer tube. A jacket surrounds the tube where the at least one buffer tube is constructed from an extruded transparent polymer, allowing the arrangement of the fiber within the buffer tube to be visible along the entire length of the tube.

BRIEF DESCRIPTION OF THE DRAWINGS

The present invention can be best understood through the following description and accompanying drawings, wherein.

DESCRIPTION OF INVENTION

Figure 3:
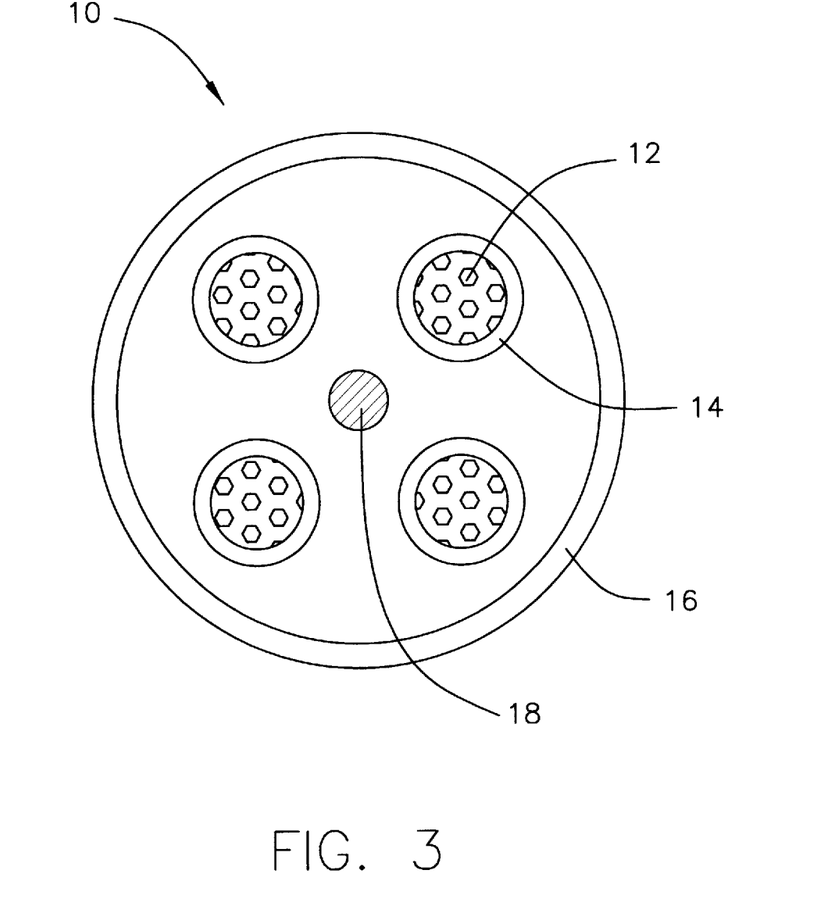
FIG. 3 shows sample cross section of a loose tube fiber optic cable, according to one embodiment.
Figure 4:
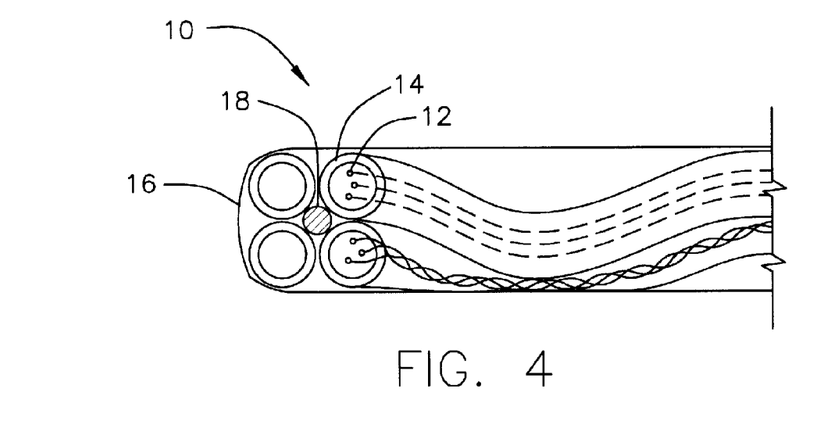
FIGS. 4-5 show perspective cut-away views of loose tube fiber optic cables, according to one embodiment.
Figure 5:
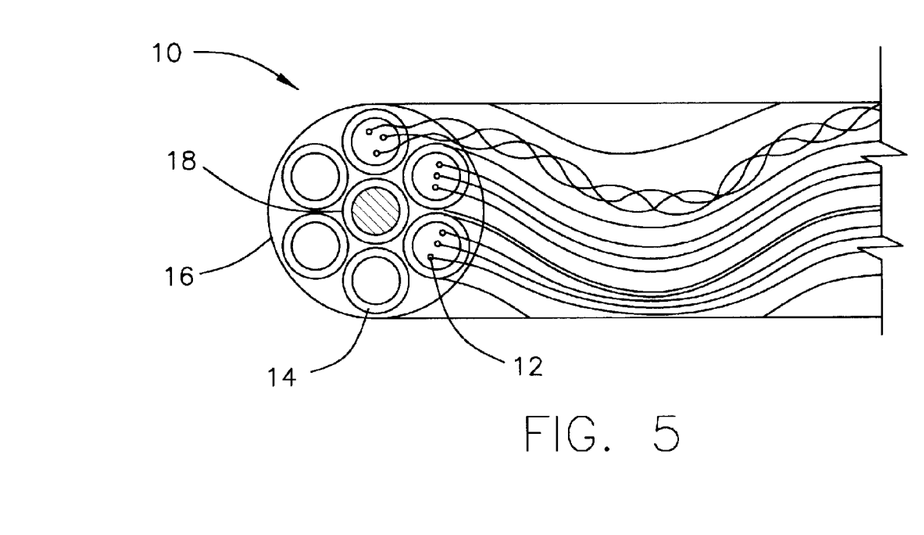

In one embodiment as shown in FIGS. 3-5, exemplary loose tube fiber optic cables 10 from both a cross section view (FIG. 3) and from longitudinal cut-away views (FIGS. 4-5).

In FIGS. 3-5, each of cables 10 show a plurality of fibers 12 contained within buffer tubes 14, enclosed within jacket 16. For the present example, cable 10 has several fibers 12, within four separate buffer tubes 14 or six buffer tubes (FIG. 5). Tubes 14 are stranded in an SZ fashion around a central strength member 18, such as a GRP (glass reinforced polymer).

Applicant first notes that FIGS. 3-5 are for exemplary purposes only and that the feature of this invention are applicable for any number of tubes 14 within jacket 16 as well as with a wide range of fiber 12 counts within tubes 14. Likewise, the present arrangement is shown in SZ stranding, but is equally applicable to uni-directional helical stranding of tubes 14 around CSM (Central Strength Member) 18.

As shown in FIG. 4, tube 14 on the top right of cable 10 shows fibers 12 exhibiting an excess length range that is in the acceptable range, whereas fibers 12 in tube 14, located in the lower right corner, have an excessive excess length and are thus bunched up within their tube 14. In FIG. 5, with six tubes 14, tube 14 on the center right of cable 10 shows fibers 12 exhibiting an excess length range that is in the acceptable range, whereas fibers 12 in tube 14, located in the upper right corner, have an excessive excess length and are thus bunched up within their tube 14. In FIG. 5, tube 14 on the lower right of cable 10 shows fibers 12 exhibiting an excess length range that is in actually below the acceptable range and is thus fibers 12 are pressed tightly against the wall of tube 14 because of the stranding.

Regarding the concept of an "acceptable" fiber length differential range, Applicant notes that this parameter is not a defined range for all fiber optic cables 10. For the purposes of illustrating the salient features of the present arrangement, in a cable 10, for larger diameter tubes 14 of 3 mm in outer diameter and a 2 mm inner diameter, a fiber length differential of 0.3% to −0.3% may be acceptable for twelve fibers 12 (depending on the fiber bend sensitivity). As another example, twelve fibers 12 in a 2.5 mm outer diameter tube 14 having a 1.5 mm inner diameter may need tighter excess length tolerances within 0.15 to −0.15%, to have acceptable attenuation after the tubing process.

On the contrary, a fiber length differential between fibers 12 and tube 14 greater than 0.3% to 1% or −0.3% to −1% may be considered outside of the desired fiber excess length range and thus requiring adjustments to the production process to correct this issue. Adjustments to the excess fiber length may be made for example by controlling and/or shifting of the fiber length differential range during the cabling process. This is done on the fly or while the line is turned off, by adjusting payoff/carry-on tensions as well as the positioning/centering of fibers 12 during the tubing process (formation of tubes 14) as well as other common production parameters.

In the stranding process (where tubes 14 are SZ or helically stranded before jacketing) the fiber excess length is altered again in either direction as per certain other factors such as tube 14 lay length, outside diameter of the central strength member, payoff and carry-on tensions, temperatures etc. . . . . Typical designs for stranded tube cables 10 account for both the 1) tensile and elongation and 2) cold temperature and shrinkage contraction direction of the tubes under various testing/operating conditions.

It is understood that that the fiber length differential numbers provided above are for exemplary purposes only. It is contemplated that the features of the present application may be applied to fiber cables 10 using any desired target fiber length differential window. As an example, depending on the final use of cable 10, a higher excess length range may in fact be desirable for an aerial cable 10 because tubes 14 would be constantly under thermal stress requiring more excess fiber length. Likewise, composite cables 10 which would include other components such as conductor copper wires etc. . . . , would also have significantly different excess length ranges for fibers 12 in tubes 14 as opposed to a purely optical cable 10.

Figure 6:
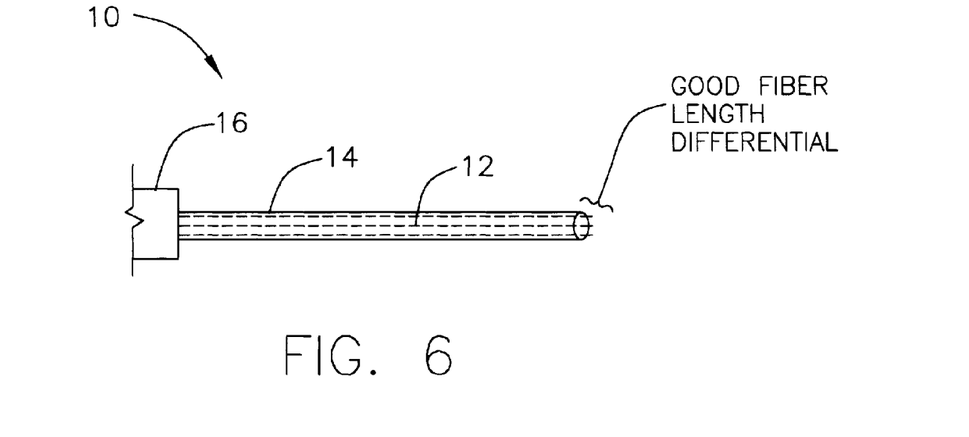
FIG. 6 shows a close up view of one clear buffer tube from the loose tube fiber optic, in accordance with one embodiment.

Turning to the structure of tubes 14, in one embodiment, as shown in FIG. 6, one of buffer tubes 14 from cable 10 are made from a transparent or transparent-translucent polymer, such as transparent/translucent HDPE (High Density Polyethylene) or other suitable clear polymer, including but not limited to (PET) polyethylene terephthalate, (PP) polypropylene, (PE) polyethylene, PVC (polyvinyl chloride; (LDPE) Low density polyethylene; and PFA (perfluoroalkoxy), having normal refractive indexes in the range of 1.3-1.6. It is understood that polymers outside the range of a refractive index of 1.3-1.6 may be used as well provided that meet the design requirements for clear tubes 14.

In this arrangement, the fibers 12, either alone or within furcation tubes, may be seen directly through tubes 14. Thus, during the manufacturing process while cable 10 is being extruded, fibers 12/fibers 12 in furcation tubes can be visually inspected within clear buffer tubes 14, allowing manufacturers to closely monitor the fiber length differential between the length of the tubes 14 and the length of fibers 12.

Figure 7:
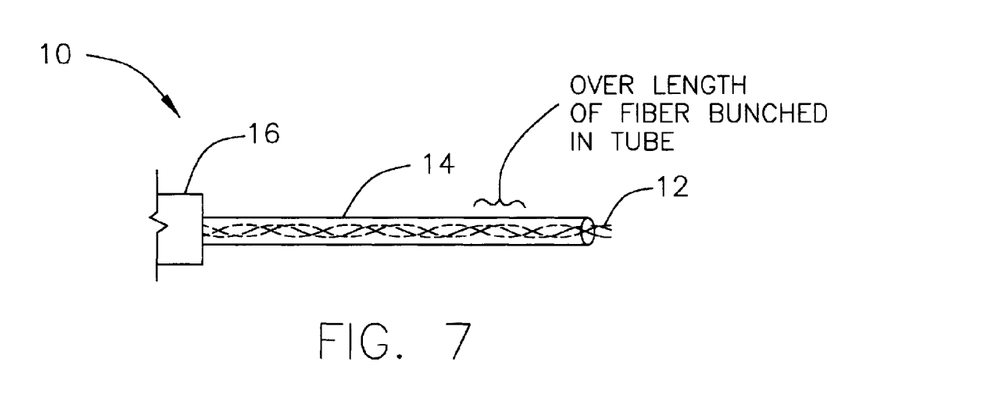
FIG. 7 shows a close up view of one clear buffer tube from the loose tube fiber optic, in accordance with one embodiment.

FIG. 6 shows an exemplary clear tube 14 with fibers 12 therein. In FIG. 6 the fiber length differential is within the acceptable limits. Conversely, in FIG. 7, an exemplary clear tube 14 with fibers 12 therein is shown where the fiber length differential is not within the acceptable limits, and thus fibers 12 are unacceptably bunched up.

In the prior art, particularly during the manufacturing process, it was difficult to tell if fibers 12 within tubes 14 were of an overly excessive (relative) length. Typically, to test the excess length parameter a test line run was performed and a test piece of cable 10 was examined to measure the excess length parameter. Thereafter the extrusion/line equipment would be adjusted. This procedure may be repeated as many times as necessary.

In the present arrangement, clear tubes 14 allow the line processor to check if too much excessive length is present in the fibers 12 during production since they are visible directly through tubes 14. Moreover, once the line equipment is calibrated, periodic tests are required less frequently as any fiber length differential issues are visible through clear tubes 14, as a simpler indicator of such a problem.

As an additional advantage, it is noted that larger, high fiber count cables 10 may be produced in a less expensive manner owing to the fact that there are no coloring agents required to make buffer tubes 14. Moreover, the lack of die in the polymer of tubes 14 is more eco-friendly and thus easier to recycle or to make from clear recycled materials.

Figure 8:
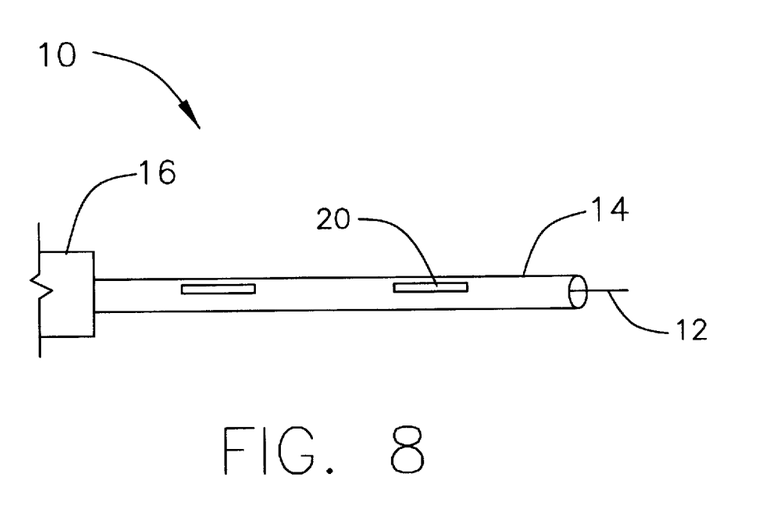
FIG. 8 shows a close up view of one clear buffer tube from the loose tube fiber optic, in accordance with one embodiment.
Figure 9A:
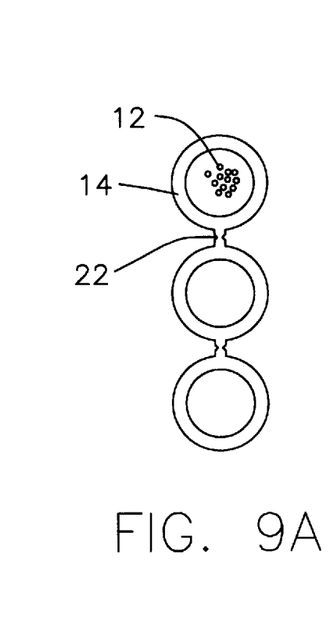
FIGS. 9A-9D shows sample cross sections of loose tube fiber optic cables, according to one embodiment.
Figure 9B:
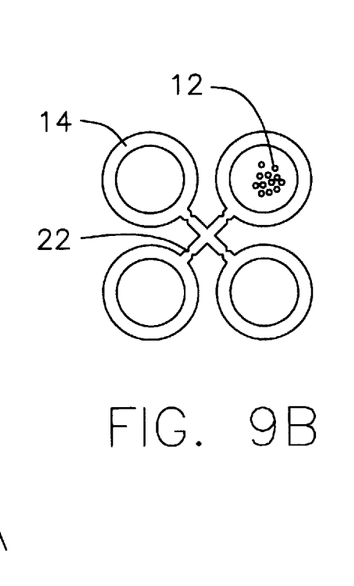
Figure 9C:
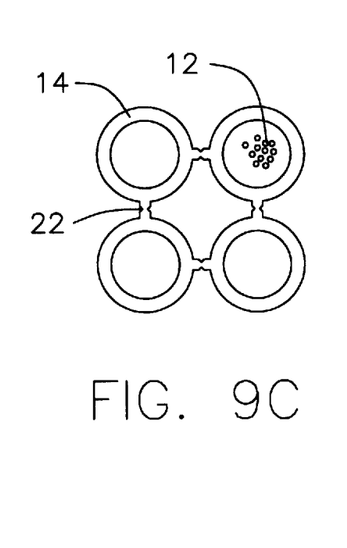
Figure 9D:
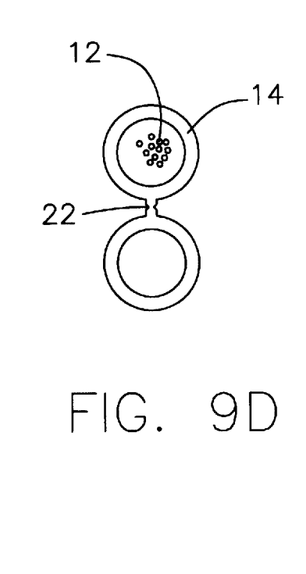

In one embodiment, shown in FIG. 8, in order to organize fibers 12/buffer tubes 14, tubes 14 may be marked/printed in identification/label regions 20 for identification purposes. This feature can compensate for the lack of color in buffer tubes 14 which would otherwise be used for organization. The markings may include, but are not limited to the name of a color corresponding to a conventional tube color, an identification number associated with that conventional tube color or even printing of the marking in the color corresponding to the color code for clear tube 14.

In another arrangement, as shown in FIG. 9A-9D, duplex, triplex and quad arrangements for cable 10 may be employed with various combinations of clear tubing 14 allowing the fibers 12 to be viewed directly as well as any interactions with certain in-tube strength members such as aramid yarns, etc. . . . . Such duplex, triplex and quad arrangements for tubes 14 within a cable 10 may include tear slots or V grooves 22 in each connection point leaving a tear thickness of 25% to 75% of the adjacent tube 14 thickness.

Figures 10A, 10B:
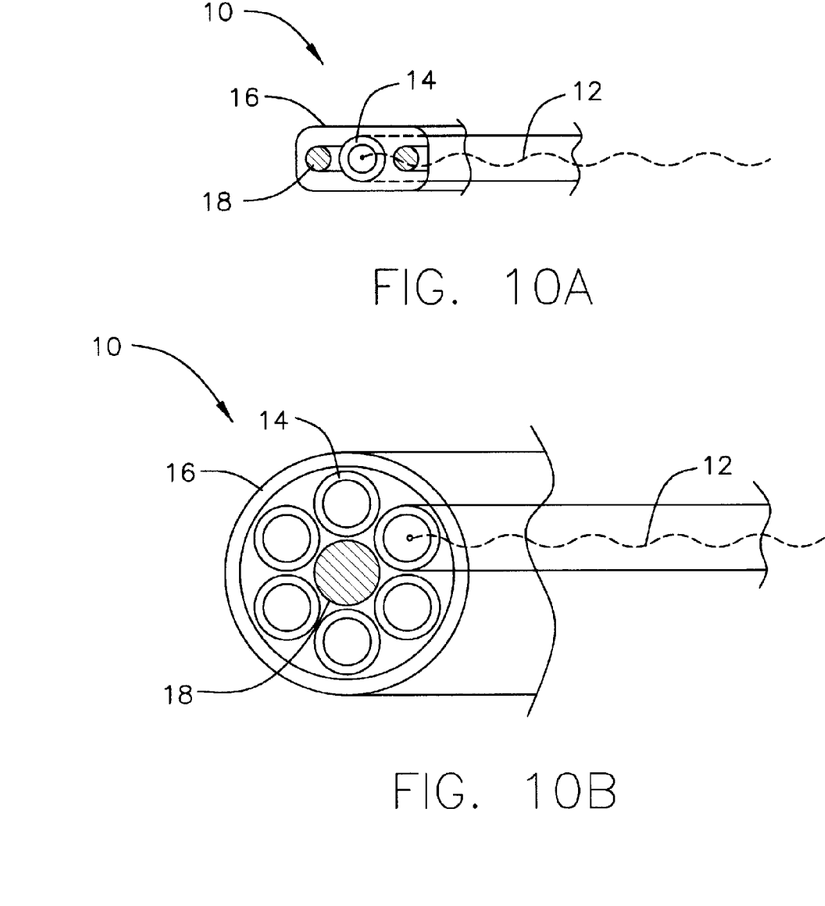
FIGS. 10A and 10B shows sample cross sections of loose tube fiber optic cables, according to one embodiment.

In another arrangement, as shown in FIGS. 10A and 10B, in addition to clear tubes 14, jacket 16 may also be made from a clear polymer, allowing fibers 12 to be viewed without even stripping of jacket 16. Such an arrangement, may be useful for indoor applications where UV protection of fibers 12 is less essential. FIG. 10A shows a flat loose tube cable 10 with one tube 14 in between two reinforcing members 18 within a clear jacket 16. FIG. 10B shows a cable 10 arranged similar to cable 10 in FIG. 5, but with a clear jacket 16. In these two arrangements, the position of strength members 18 (which are not necessarily clear) are such that their position does not interfere with the viewing of fibers 12 from the outside of cable 10 through both jacket 16 and tubes 14.

It is noted that clear polymers used for both tubes 14 and jacket 16 may include certain flame retardant (FR) additives which tend to render the these components more opaque. However, within the context of the present application, such additives are preferably kept to a minimum for use in fields that have lower fire ratings. As an alternative, when jacket 16 is opaque and only tubes 14 are clear polymer, then extra fire retardant additives may be used to make up for the lack thereof in tubes 14.

Figure 11:
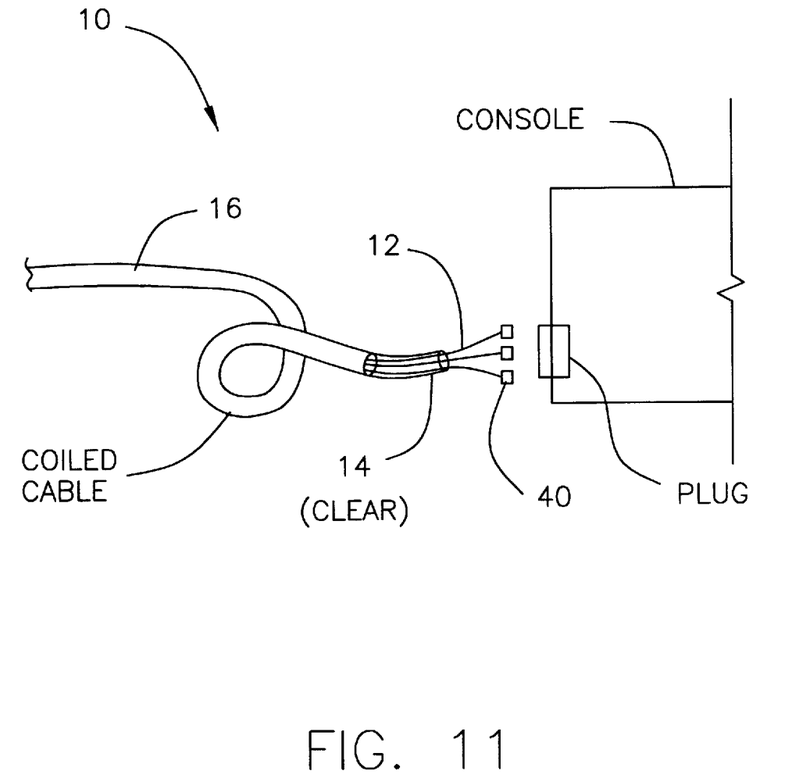
FIG. 11 shows an exemplary preterminated fiber optic cable, in accordance with one embodiment.

In another embodiment, after the production advantages discussed above, clear tubes 14 of cable 10 may also provide advantages during the installation of pre-terminated cable(s) 10. Such pre-terminated type fiber optic cables 10 are common in the industry. A pre-terminated loose tube fiber optic cable 10 may include any number of fiber optic elements 12. By way of example, FIG. 11 shows a cable 10 having three buffer tubes 14, with twelve UV coated fiber optic elements 12 therein. As with the above example, jacket 16 covers tubes 14.

In the present arrangement illustrated in FIG. 11, pre-terminated cable 10 includes connectors 40 on the ends of each of the twelve fiber elements 12 in groups of one, two, three or four fibers. In the present example shown in FIG. 11 cable 10 has three tubes 14 of four fibers 12 each, with each of the four fiber elements 12 in a given tube 14, pre-terminated with one four-fiber connector 40. It is understood that many other similar combinations of pre-terminated cables 10 fall within the purview of the present arrangement.

As noted above, buffer tubes 14 are clear, allowing visual inspection of the loose fiber elements 12 therein. Fiber elements 12 my be independent or held within furcation tubes, depending on the desired design.

Typically, as shown in FIG. 11, a portion of jacket 16 is stripped away from pre-terminated cable 10. Some amount of buffer tubes 14 extend from the end, typically 5'-50' feet depending on the particular application (eg. server farms, etc. . . . ). Thereafter, fiber elements 12 extend even further from the ends of tubes 14 until they reach the back end of connector 40.

During installation, a user may place the majority of jacketed cable 10 into some sub-floor or overhead tray or within a wall. At some point, when the desired component to be connected to is located, the portion of tube 14 that extends from jacket 16 is then directed to the appropriate connection point. As noted above, some portion of tube 14 is exposed. In the event that the length of tube 14 that is exposed is longer than necessary, this excess buffer tube is usually coiled and clipped behind the component as shown in FIG. 11.

As noted earlier, the excess length of fibers 12 relative to their respective buffer tubes 14, is always an issue because if there is too much excess fiber 12 within a tube 14, fibers 12 may bunch-up, bend and be subjected to attenuation problems. A proper excess length for the fibers 12 relative to tube 14 on the other hand results in smooth uniform fiber paths and a lesser chance for attenuation.

According to the present arrangement, because tubes 14 are clear, an installer may look at fibers 12 within tubes 14 during the excess tube length coiling operation to make sure that the fibers 12 therein are maintained in a smooth, relatively relaxed, arrangement. If the installer notices bunched or contorted fibers, they may unroll the coiled tube 14, check for the smoothness of the fibers 12 therein and then slowly re-roll the coil of tube 14, while checking on fibers 12 within using a larger or less tightly coiled installation arrangement to relive the fiber strain.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A fiber optic cable, said cable comprising:
   at least one fiber;
   at least one clear buffer tube surrounding said fiber, with said fiber being loosely held within said clear buffer tube;
   a jacket surrounding said at least one clear buffer tube, wherein said at least one clear buffer tube is constructed from an extruded transparent polymer that remains clear after extrusion, allowing the arrangement of said fiber within said clear buffer tube to be visible along the entire length of said clear buffer tube, and
   wherein said at least clear buffer tube is transparent to electromagnetic radiations with a wavelength between 390 nm and 750 nm so that the arrangement of said fiber can be visually inspected by the human eye to allow adjustments to the fiber optic cable production process, if there is a fiber length differential between said fiber and said clear buffer tube greater than 0.3% to 1% or −0.3% to −1%.

2. The cable as claimed in claim 1, further comprising a plurality of clear buffer tubes, each with a plurality of fibers therein.

3. The cable as claimed in claim 2, further comprising a strength member within said jacket.

4. The cable as claimed in claim 1, wherein said jacket is made of transparent polymer.

5. The cable as claimed in claim 1, wherein said transparent polymer for said clear buffer tubes are selected from the group consisting of transparent/translucent HDPE (High Density Polyethylene); (PET) polyethylene terephthalate; (PP) polypropylene; (PE) polyethylene, PVC (polyvinyl chloride; (LDPE) Low density polyethylene; and PFA (perfluoroalkoxy).

6. The cable as claimed in claim 1, wherein said transparent polymer for said clear buffer tubes has a normal refractive indexes substantially in the range of 1.3-1.6.

7. The cable as claimed in claim 1, wherein said fibers are within said clear buffer tubes at a desired target range of excess length relative to a length of said clear buffer tube, wherein an actual amount of excess length is visible through said transparent polymer of said clear buffer tubes.

8. The cable as claimed in claim 1, wherein said at least one clear buffer tube is constructed from an extruded transparent polymer such that said clear buffer tubes is clear along its entire length, allowing the arrangement of said fiber within said buffer tube to be visible along the entire length of said clear buffer tube during both manufacture and installation.

9. The cable as claimed in claim 1, wherein said clear buffer tubes include marking indicators corresponding to industry standard color markings.

10. The cable as claimed in claim 9, wherein said marking indicators corresponding to industry standard color markings are made in a colored ink/dye that matches the color marking.

\* \* \* \* \*